United States Patent
Goebels et al.

(10) Patent No.: US 12,057,279 B2
(45) Date of Patent: Aug. 6, 2024

(54) SWITCHING DEVICE COMPRISING TWO INTERRUPTER UNITS CONNECTED IN SERIES

(71) Applicant: Siemens Energy Global GmbH & Co. KG, Munich (DE)

(72) Inventors: Tobias Alexander Goebels, Nordrhein-Westfalen (DE); Sylvio Kosse, Erlangen (DE); Paul Gregor Nikolic, Erlangen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 200 days.

(21) Appl. No.: 17/635,076

(22) PCT Filed: May 18, 2020

(86) PCT No.: PCT/EP2020/063754
§ 371 (c)(1),
(2) Date: Feb. 14, 2022

(87) PCT Pub. No.: WO2021/028085
PCT Pub. Date: Feb. 18, 2021

(65) Prior Publication Data
US 2022/0293369 A1    Sep. 15, 2022

(30) Foreign Application Priority Data
Aug. 13, 2019  (DE) ..................... 10 2019 212 106.3

(51) Int. Cl.
*H01H 33/14*   (2006.01)
*H01H 33/662*  (2006.01)
*H01H 33/666*  (2006.01)

(52) U.S. Cl.
CPC .......... *H01H 33/666* (2013.01); *H01H 33/14* (2013.01); *H01H 33/662* (2013.01); *H01H 2033/146* (2013.01)

(58) Field of Classification Search
CPC .... H01H 33/666; H01H 33/662; H01H 33/14; H01H 33/161; H01H 2033/146; H01H 2033/6667; H01G 5/16; H01G 5/40
(Continued)

(56) References Cited

U.S. PATENT DOCUMENTS 1,792,340 A   2/1931 Wellman
3,411,038 A   11/1968 Lee
(Continued)

FOREIGN PATENT DOCUMENTS

CN   200947544 Y   9/2007
CN   101393818 A   3/2009
(Continued)

OTHER PUBLICATIONS

Translation of JPS61126719 (Original document published Jun. 14, 1986) (Year: 1986).*

*Primary Examiner* — William A Bolton
(74) *Attorney, Agent, or Firm* — Laurence A. Greenberg; Werner H. Stemer; Ralph E. Locher

(57) ABSTRACT

A switching device includes: two interrupter units connected in series; at least one drive unit for moving at least one contact; and two control capacitors, each of which is connected in parallel with the interrupter units. At least one control capacitor has mechanically movable components for changing the capacitance, and at least one of these components is mechanically coupled to the drive unit.

8 Claims, 3 Drawing Sheets

(58) Field of Classification Search
USPC ....... 218/140, 120, 134, 139, 144, 145, 146, 218/153, 154
See application file for complete search history.

(56) References Cited

U.S. PATENT DOCUMENTS

| | | | |
|---|---|---|---|
| 3,447,047 A | 5/1969 | Lindsay | |
| 3,541,284 A | 11/1970 | Wachta | |
| 3,839,612 A * | 10/1974 | Badey | H01H 33/14 218/7 |
| 4,087,664 A * | 5/1978 | Weston | H01H 33/143 218/3 |
| 4,434,332 A * | 2/1984 | Yanabu | H01H 33/143 218/144 |
| 4,492,835 A * | 1/1985 | Turner | H01H 33/6661 218/7 |
| 5,124,872 A | 6/1992 | Pham et al. | |
| 5,170,023 A | 12/1992 | Pham et al. | |
| 6,498,315 B1 * | 12/2002 | Betz | H01H 33/666 218/120 |
| 6,920,033 B2 | 7/2005 | Jahreiss et al. | |
| 8,847,095 B2 * | 9/2014 | Donzel | H01H 33/666 218/7 |
| 10,170,255 B1 * | 1/2019 | Glaser | H01H 33/168 |
| 10,312,038 B2 * | 6/2019 | Suwa | H01H 33/16 |
| 2009/0014418 A1 * | 1/2009 | Jahn | H01H 33/14 218/144 |
| 2014/0146422 A1 * | 5/2014 | Nomura | H01H 33/16 361/4 |
| 2014/0166622 A1 | 6/2014 | Abe et al. | |
| 2014/0299579 A1 | 10/2014 | Hartmann et al. | |
| 2015/0206676 A1 * | 7/2015 | Sato | H01H 33/59 335/136 |

FOREIGN PATENT DOCUMENTS

| | | |
|---|---|---|
| CN | 104810200 A | 7/2015 |
| DE | 2526942 A1 | 12/1976 |
| DE | 2552086 A1 | 5/1977 |
| DE | 102011083514 A1 | 3/2013 |
| JP | S61126719 A | 6/1986 |
| JP | H0382023 A | 8/1991 |
| JP | H04230922 A | 8/1992 |
| WO | WO 03028789 A1 | 4/2003 |
| WO | 2013035547 A1 | 3/2013 |
| WO | 2018230224 A1 | 12/2018 |

* cited by examiner

SWITCHING DEVICE COMPRISING TWO INTERRUPTER UNITS CONNECTED IN SERIES

FIELD AND BACKGROUND OF THE INVENTION

The invention relates to a switching device having two interrupter units connected in series. The device has at least one drive unit for moving at least one contact and two control capacitors which are connected in parallel with the interrupter units in each case.

Serial connections or series connections of interrupter units have multiple uses in the field of energy supply. By way of example, one application consists in a switching device comprising a plurality of interrupter units in the form of vacuum switching tubes, which are connected in series (synonymous with a serial connection), and the electric strength being increased as a result of the series connection in the case of high-voltage applications. Ultimately, however, the series connection of interrupter units essentially serves to increase the electric strength of the circuit with respect to individual tubes. In this case, a technical requirement is to ensure that the voltage distribution to the individual interrupter units connected in series is controlled such that none of the interrupter units is loaded beyond its electric strength.

To ensure the voltage distribution between the individual interrupter units, control capacitors are in turn connected in parallel with each interrupter unit. Depending on the so-called post-arc current, which flows in the interrupter unit after the current interruption has taken place, the voltage distribution between the two or more interrupter units when using control capacitors deviates from the calculated or statistical case. The post-arc current mentioned can be caused for example by metal vapor in the vacuum tube or residual charge carriers in the switching path. The voltage distribution between the interrupter units during the switching procedure is therefore not steady, but dynamic.

However, this dynamic of the voltage distribution during the switching procedure results in the said control capacitors being unable to prevent one of the interrupter units having to cope with a higher voltage than its rated voltage, i.e. than its so-called electric strength allows, if only for a brief period of time. Therefore, in the case of the series connection of interrupter units, in particular in the case of vacuum tubes, these need to be configured so as to ensure significant reserves with regard to the electric strength of the individual interrupter units. If a particular rated voltage is stipulated, it may be that either two interrupter units with a higher rated voltage than is nominally required have to be connected in series or more than two interrupter units with a lower rated voltage have to be connected in series. In both cases, the cost of achieving the stipulated total rated voltage of the series connection owing to the dynamic voltage distribution during the switching procedure is higher than if the rated voltages of the individual components were purely combined. This calls for greater investment in interrupter units for a specified rated voltage.

SUMMARY OF THE INVENTION

The object of the invention consists in providing a switching device having two or more interrupter units connected in series, which has a higher electric strength compared to the prior art whilst using the same components.

The object is achieved in a switching device having two interrupter units connected in series, as claimed.

The switching device as claimed in has at least two interrupter units connected in series, having at least one drive unit for moving at least one contact and having two control capacitors, which are connected in parallel with the interrupter units in each case. The switching device is notable in that at least one control capacitor has mechanically movable components for changing the capacitance and at least one of these components has a mechanical coupling to the drive unit.

As a result of coupling a movable component of the control capacitor to the drive unit, which also serves to drive at least one interrupter unit, during the actual switching procedure in which the voltage distribution between the at least two interrupter units connected in series varies dynamically, the control capacitor can have an influence which ensures that, during the switching procedure, approximately the same voltage is present at both interrupter units at any time of the switching procedure. It is thus possible to make full use of the rated voltage, i.e. the voltage with which the selected interrupter unit is to be operated with maximum reliability, during the series connection. Safety reserves in the electric strength which are held available for a possible dynamic voltage distribution during the switching procedure can be significantly reduced. This is advantageous in that either fewer interrupter units have to be connected in series or interrupter units with a lower rated voltage have to be connected in series to achieve a stipulated maximum switching voltage. Both cases result in a lower investment in the interrupter units needed to ensure a corresponding stipulated rated voltage.

This arrangement is particularly expedient when using vacuum switching tubes as interrupter units. In this case, two or more vacuum switching tubes, as mentioned, can be connected serially or in series. However, a vacuum switching tube can essentially also be connected in series with a gas path.

The control capacitor, which ensures the dynamic control of the capacitance, has at least one movable component, which is mechanically coupled to the drive unit. This can essentially be the dielectric, which is displaced with respect to one or two electrodes; however, an electrical contact can also be displaced along an electrode or dielectric. Electrodes can essentially also be displaced with respect to a fixed dielectric. The possible described movements of the corresponding components of the control capacitor result in a dynamic change in the capacitance present at the capacitor.

In this case, the term mechanical coupling is understood such that the control capacitor is in mechanical communication with the drive unit, which means that a mechanical connection is present to transmit a force, an impulse or an action between two systems. By way of example, this will be realized via movable connections such as bearings or joints, but also via fixed connections such as bonded of force-fitting connections or combinations of movable and fixed connections.

This mechanical connection is also understood to include a transmission element, for example a gear. This transmission element is suitable for contributing to the control of the movement kinematics of the corresponding component of the control capacitor. The drive unit of the switching device or an individual interrupter unit is configured such that the opening or closing procedure of a contact or a contact system is optimized precisely for this purpose. If the said drive unit, which drives one or more interrupter units of the switching device, is simultaneously used to move corresponding components of the control capacitor such that a dynamically changed capacitance of the control capacitor is present, which in turn results in a compensation of the voltage peaks in the interrupter unit, it may be necessary for these kinematics to follow a different principle from that which applies to the optimized drive unit of the switching contacts. The necessary progression of the capacitance of the control capacitor for influencing the voltage differences between the interrupter units can be determined experimentally. Based on this experimental data, it is possible to determine a necessary change in the control capacitance and therefore a corresponding change over time or a speed of change or kinematics of change of the control capacitance.

From this information, it is possible to calculate the gear kinematics of the transmission element, which serves to move the components of the control capacitor with respect to one another during the switching procedure such that the correct capacitance is present in each case.

In this case, in the representation of the variable control capacitor, a plurality of arrangements with regard to the capacitor and the interrupter unit are possible. An advantageous configuration consists in the interrupter unit being provided with an insulator housing, wherein the housing is not grounded. This refers to a so-called live-tank design. In this case, the control capacitor is arranged outside the non-grounded insulating housing and connected in parallel with the contacting means of the interrupter unit.

In a further configuration, for example in a gas-insulated circuit or a so-called dead-tank design for interrupter units, the housing of these interrupter units is grounded. In this case, it may be expedient to configure the control capacitor as part of the entire interrupter unit in such a way that a cylindrical dielectric is mounted to be movable along a switching axis between a housing of the interrupter unit and a vacuum switching tube located therein.

Further configurations of the invention and further features are explained in more detail with reference to the following figures. These are purely schematic configurations, which do not represent a restriction of the scope of protection.

DETAILED DESCRIPTION OF THE INVENTION

Figure 1:
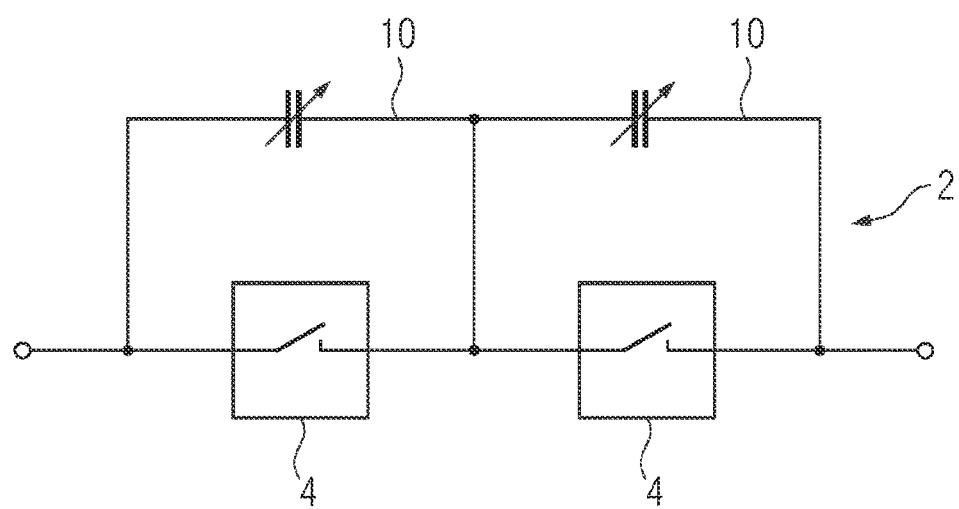
FIG. 1: shows a circuit diagram of a switching device in this case with two interrupter units, which are connected in series and a parallel-connected variable control capacitor is present for each interrupter unit.
Figure 2:
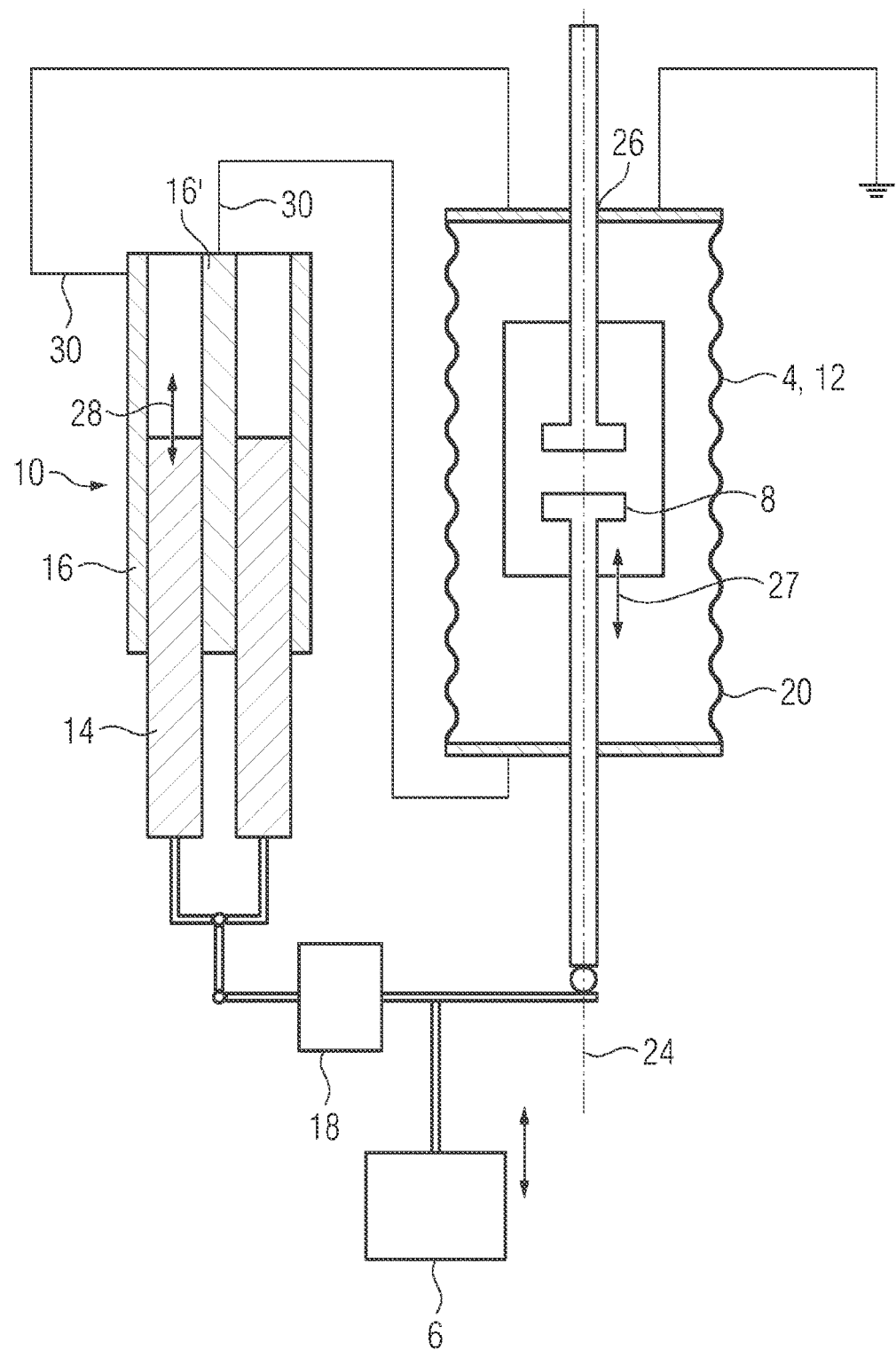
FIG. 2: shows an interrupter unit in a live-tank design, with a parallel-connected control capacitor.
Figure 3:
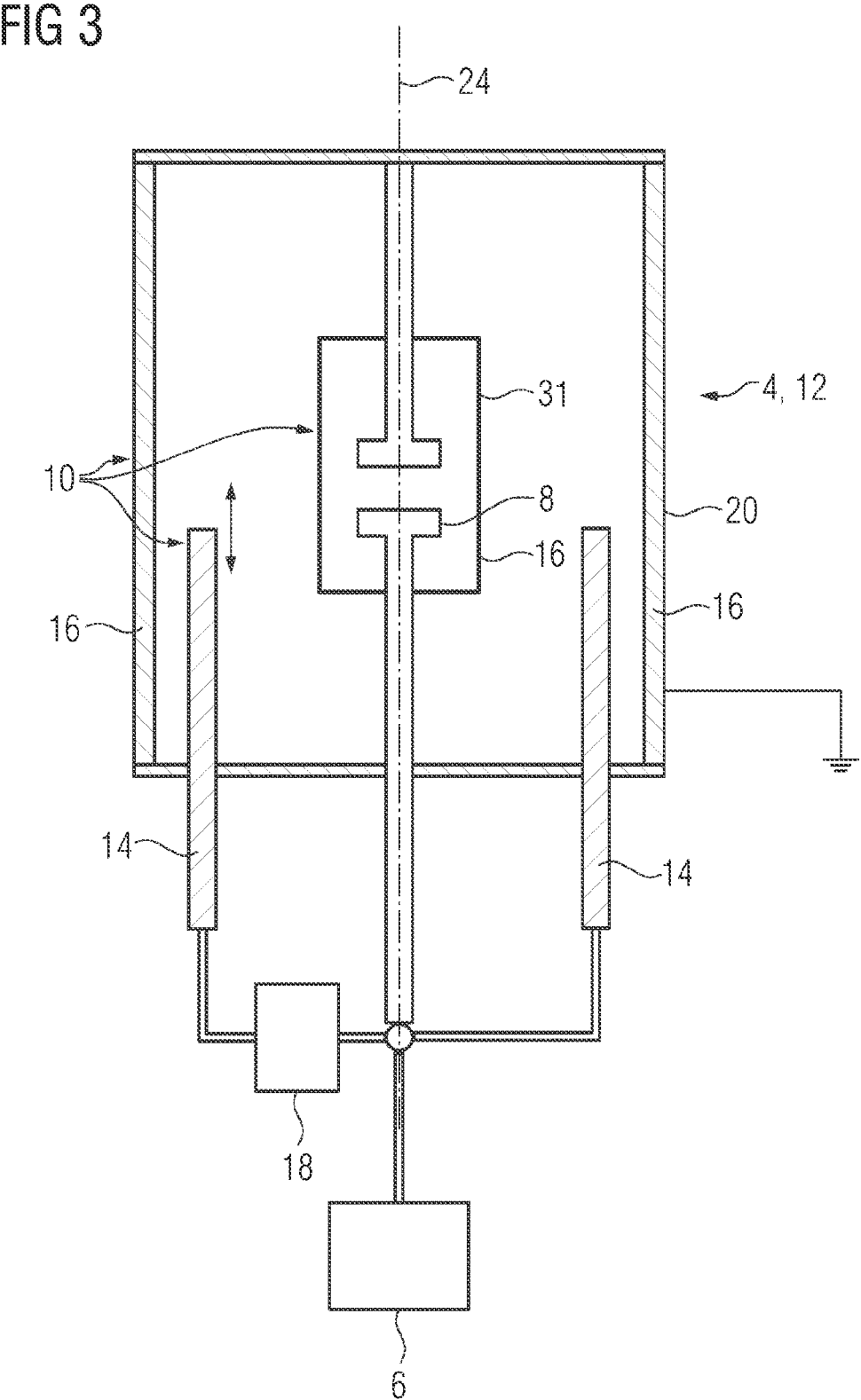
FIG. 3: shows an interrupter unit in a dead-tank configuration, wherein a vacuum tube is arranged in a grounded housing and a dielectric is movably mounted with the housing.

In FIG. 1, a schematic illustration of a circuit diagram is shown, which illustrates how the switching device is essentially electrically connected. To this end, two interrupter units 4 are connected serially or in series; a variable control capacitor 10 is in turn connected in parallel with each interrupter unit 4. The overall connection between the interrupter units 4 and the control capacitors 10 represents the switching device 2. The interrupter units 4 are preferably configured in the form of vacuum switching tubes 12, as illustrated in FIGS. 2 and 3. However, a vacuum switching tube 12 can essentially be connected in series with an interrupter unit in the form of a gas path.

Only part of the switching device 2 is illustrated in FIGS. 2 and 3 in each case, namely only one interrupter unit 4 in each case, with the control capacitor connected in parallel therewith. The interrupter unit 4 according to FIG. 2 is a vacuum switching tube 12 in a so-called live-tank configuration. In this case, the vacuum tube 12 is embedded in an insulating housing 2, wherein the insulating housing 20 insulates a current path with respect to the environment and is therefore also not grounded. The components of the vacuum switching tube 12 are illustrated in a very schematic form in FIG. 2, the vacuum switching tube has a contact 8, which is movably mounted and can be moved in a translatory manner along a switching axis 24 with respect to a counter contact (not mentioned here in more detail). To this end, a drive unit 6 is provided, which results in a translatory movement 27 along the switching axis 24. The drive unit 6 is furthermore mechanically coupled to the control capacitor 10 via a transmission element 18 in the form of a gear. The control capacitor 10 is constructed cylindrically in the configuration according to FIG. 2, wherein an outer cylinder wall represents an electrode 16 and a further electrode 16' is likewise arranged cylindrically in the center of the said cylinder. A dielectric 14 is furthermore provided, which is likewise mounted to be movable in a translatory manner along a cylinder longitudinal axis in a cylindrical clearance between the first electrode 16 and the second electrode 16'. The electrodes 16, 16' and the dielectric 14 represent components of the control capacitor 10, wherein, in this case, the dielectric 14 is in mechanical communication with the drive unit via the transmission element 18 and is therefore mechanically connected to the said drive unit. When the contact 8 is closed as a result of the movement of the drive unit 6, a movement of the dielectric 14 along the arrow 28 is simultaneously realized.

FIG. 2 refers to an exemplary illustration here, in which the dielectric 14 is moved along the arrow 28. It would essentially also be possible to mount the electrode 16' or the electrode 16 such that it can be moved by the drive unit 6 via the transmission element 18. As a result of the translatory movement of the dielectric 14 (or another component of the control capacitor 10), the capacitance which is present between the electrodes 16, 16' or between contacts 30 of the control capacitor 10 changes during the switching procedure. This means that the capacitance which, with respect to the interrupter unit 4 or the vacuum switching tube 12, is present in parallel with this interrupter unit 4 during the switching procedure is time-variable during the switching procedure.

The control capacitor 10 has a cylindrical configuration in FIG. 2. In this case, the structure of the control capacitor can be essentially changed. The design in the form of plate capacitors with plate-shaped capacitors and dielectrics is also expedient in this case.

According to the prior art, the control capacitors according to FIG. 1 are adversely affected by a fixed capacitance. Capacitances which, for this purpose, are typically present in a performance category of the vacuum switching tube of 245 kV are between 300 pF and 2000 pF. If the switching behavior of the vacuum switching tube 12 or the interrupter unit 4 is generally known, the voltage present in each case can be measured during the switching procedure. This refers to the voltage which occurs at any time t during the switching behavior when using a control capacitor with a fixed capacitance. By changing the capacitance of the control capacitor 10, as depicted here in FIGS. 1 to 3, it is possible to influence the voltage present at the interrupter unit 4 subject to time during the switching procedure. To this end, it may be necessary for the capacitance of the control capacitor to change non-linearly during the switching procedure, which in turn results in the transmission element 18 having to be configured in such a way that the desired movement kinematics are established for the movement of the dielectric 14. This can be achieved via suitable measures, which are known from gear manufacturing. It is therefore possible to establish a precise capacitance change such that, during the switching procedure, a virtually constant and equal voltage is present at the interrupter units 4 according to FIG. 1.

If this voltage can be determined and also influenced, as depicted by the device according to FIG. 2, it is possible to select an interrupter unit 4 for a specified rated voltage of the series connection according to FIG. 1 in each case such that it is very close to its nominal voltage which determines the electric strength of the interrupter unit 4. Therefore, with a specified rated voltage of the individual interrupter unit 4, i.e. a particular vacuum switching tube 12 in a particular voltage class, for example, the series connection achieves a greater electric strength than would be the case without the variable control capacitors 10. This in turn means that, to provide a particular electric strength of a switching device, interrupter units 4 or vacuum switching tubes 12 with a lower electric strength in each case can be used overall, which can significantly reduce the total investment costs for the switching device 2.

An alternative configuration of the parallel circuit of FIG. 1, namely comprising the interrupter unit and the control capacitor 10, is illustrated in FIG. 3. In contrast to the parallel connection of the interrupter unit 4 and control capacitor 10 of FIG. 2, the illustration in FIG. 3 refers to an interrupter unit according to the so-called dead tank design, in which a vacuum switching tube 12 is arranged in a housing 22. The difference with respect to the insulating housing 20 in FIG. 2 consists in that the housing 22 in FIG. 3 is grounded. This therefore means that there is an electrical field between an outside of the vacuum tube 12 and the housing 22 during the switching procedure. This electrical field can be influenced if a dielectric 14 is incorporated between the vacuum tube 12 and the housing 22. In this case, both the housing 16 and a housing 31 of the vacuum tube 12 act as electrodes 16. If, as already described with reference to FIG. 2, the dielectric is moved analogously between the housing 31 and the housing 22 via a transmission element 18, i.e. by a gear, during the switching procedure, this has a capacitance-changing effect.

The control capacitor 10 in the illustration according to FIG. 3 is therefore formed by the housing 20, the housing 31 of the vacuum switching tube 12 and by the dielectric 14. It also applies again here that the dielectric 14 is driven together with the contact 8 by the drive unit 6 during the switching procedure. In this case, as already depicted in FIG. 2, a coupling of the movement kinematics between the movement of the contact 8 and the dielectric 14 is ensured by the transmission element 18. The capacitance change during the switching procedure can thus also be mechanically coupled to the drive of the contact 8 here, although, in dynamic terms, it can take place independently of this.

LIST OF REFERENCE SIGNS

2 Switching device
4 Interrupter unit
6 Drive unit
8 Contact
10 Control capacitor
12 Vacuum switching tube
14 Dielectric
16 Electrode
18 Transmission element
20 Insulating housing
22 Housing (grounded)
24 Switching axis
26 Contacting means
27 Translatory movement
28 Movement, dielectric
30 Contacts
31 Housing, vacuum switching tube

The invention claimed is:

1. A switching device, comprising:
two interrupter units connected in series;
at least one drive unit for moving at least one contact of the switching device;
two control capacitors respectively connected in parallel with one of said interrupter units;
at least one of said two control capacitors having a mechanically movable component for changing a capacitance thereof and said movable component being mechanically coupled to said at least one drive unit; and
wherein said moveable component is moved to keep a voltage constant, the voltage being applied to the interrupter unit having said at least one contact.

2. The switching device according to claim 1, wherein at least one of said interrupter units is a vacuum switching tube.

3. The switching device according to claim 1, wherein said at least one movable component of said control capacitor is a component selected from the group consisting of a dielectric, an electrode, and an electrical contact.

4. The switching device according to claim 1, further comprising a transmission element configured for controlling a movement kinematics of said at least one movable component.

5. The switching device according to claim 1, wherein at least one of said interrupter units is embedded in a non-grounded insulating housing.

6. The switching device according to claim 5, wherein said at least one control capacitor is arranged outside said non-grounded insulating housing.

7. The switching device according to claim 1, wherein at least one of said interrupter units is surrounded by a grounded housing.

8. The switching device according to claim 7, wherein said at least one movable component of said control capacitor is a dielectric having a cylindrical configuration and said dielectric is displaceably mounted for translation along a switching axis between said vacuum switching tube and said grounded housing.

* * * * *